(12) United States Patent
Nakazono et al.

(10) Patent No.: US 8,674,818 B2
(45) Date of Patent: Mar. 18, 2014

(54) IN-VEHICLE MONITORING SYSTEM

(75) Inventors: Masahiro Nakazono, Ise (JP); Chiaki Izumoto, Watarai-gun (JP); Shogo Sagara, Watarai-gun (JP)

(73) Assignee: Panasonic Corporation, Osaka (JP)

( * ) Notice: Subject to any disclaimer, the term of this patent is extended or adjusted under 35 U.S.C. 154(b) by 467 days.

(21) Appl. No.: 12/972,783

(22) Filed: Dec. 20, 2010

(65) Prior Publication Data
US 2011/0148612 A1 Jun. 23, 2011

(30) Foreign Application Priority Data
Dec. 22, 2009 (JP) ................. 2009-291447

(51) Int. Cl.
*B60Q 1/00* (2006.01)
(52) U.S. Cl.
USPC ......... 340/435; 340/436; 340/438; 340/425.5
(58) Field of Classification Search
USPC ........................................ 340/435
See application file for complete search history.

(56) References Cited

U.S. PATENT DOCUMENTS

| 6,163,252 | A * | 12/2000 | Nishiwaki | 340/435 |
| 2003/0236605 | A1* | 12/2003 | Takahashi | 701/45 |
| 2005/0134440 | A1* | 6/2005 | Breed | 340/435 |
| 2006/0087415 | A1* | 4/2006 | Simonazzi | 340/435 |

FOREIGN PATENT DOCUMENTS

| CN | 101169479 A | 4/2008 |
| JP | 62-277584 A | 12/1987 |
| JP | 2000-275344 A | 10/2000 |
| JP | 2005-9992 A | 1/2005 |
| JP | 2006-322834 A | 11/2006 |

OTHER PUBLICATIONS

The First Office Action for the Application No. 201010608721.2 from The State Intellectual Property Office of the People's Republic of China dated Aug. 3, 2012.

* cited by examiner

*Primary Examiner* — Kerri McNally
(74) *Attorney, Agent, or Firm* — McDermott Will & Emery LLP

(57) ABSTRACT

An in-vehicle monitoring system is configured to determine the presence of an object when the number of continuous generations of an object detection signal obtained in connection with a transmission signal reaches a threshold. The in-vehicle monitoring system comprises an adjustment unit configured to decrease the threshold if the distance obtained from a transmission signal and an object detection signal decreases.

4 Claims, 3 Drawing Sheets

IN-VEHICLE MONITORING SYSTEM

TECHNICAL FIELD

The invention relates generally to in-vehicle monitoring systems and, more particularly, to an in-vehicle monitoring system for monitoring an object (an obstacle) at the periphery of a vehicle.

BACKGROUND ART

An ultrasonic distance sensor is traditionally used as an in-vehicle monitoring system configured to monitor the periphery of a vehicle such as a car or the like to detect an obstacle. The ultrasonic distance sensor is configured: to transmit an ultrasonic sound through a transducer (transceiver); to receive the ultrasonic sound (reflected waves) reflected by an object (an obstacle) at the periphery of a vehicle through the transducer; and to measure the distance to the object based on receiving of the reflected waves.

This sort of in-vehicle monitoring system is used for giving an alarm to a driver of the vehicle when a distance between the vehicle and an obstacle is shorter than a predetermined distance, or for superimposing location information of the obstacle on ambient video captured by a camera. What is needed is to precisely determine the presence of an obstacle and the distance to the obstacle regardless of the distance between the vehicle and the obstacle.

Therefore, Japanese Patent Application Publication Number 2005-9992 discloses a vehicle surrounding monitoring system. This system is configured to repeatedly measure a distance between a vehicle and an obstacle with a predetermined period through a distance sensor to determine the distance to the obstacle and the shape of the obstacle based on continuous measurement results (distances between the vehicle and the obstacle), thereby precisely monitoring the surrounding.

In such in-vehicle monitoring systems, as the distance to an obstacle becomes longer, a signal level of reflected waves received through a distance sensor becomes weak. Accordingly, there is a possibility that false detection of obstacle occurs under the influence of noise.

For example, if the number of measurements for detecting an obstacle is increased, a far obstacle can be precisely detected. However, increasing the number of measurements causes a large time lag from first receiving reflected waves by an obstacle to outputting a detection result. Also, when an obstacle exists near the vehicle or in its traveling direction, there is a possibility that an alarm emitted by detecting an obstacle is delayed. In order to reduce the time lag, if the number of measurements for detecting an obstacle is decreased, there is a possibility that a far obstacle or an obstacle in the opposite direction of a vehicle's traveling direction cannot be detected, or false object detections frequently occur under absence of obstacle.

DISCLOSURE OF THE INVENTION

It is an object of the present invention to stably detect an object (an obstacle) while reducing false detection regardless of the distance to the object and a vehicle's traveling direction.

An in-vehicle monitoring system of the present invention is configured to determine the presence of an object when the number of continuous generations of an object detection signal obtained in connection with a transmission signal reaches a threshold. According to an aspect of the invention, the in-vehicle monitoring system comprises an adjustment unit configured to decrease the threshold if the distance obtained from a transmission signal and an object detection signal decreases.

In the present invention, it is possible to stably detect an object (obstacle) while reducing false detection regardless of the distance to the object and a traveling direction of a vehicle equipped with the in-vehicle monitoring system.

In an embodiment, the in-vehicle monitoring system comprises an object detector, a measurement unit and a judgment unit. The object detector is configured: to transmit transmission waves by (in response to) a transmission signal; and then to generate an object detection signal if receiving incoming waves. The measurement unit is configured to measure the distance to the object based on a time interval from transmitting the transmission waves by the transmission signal to generating the object detection signal. The judgment unit is configured to determine the presence of an object when the number of continuous generations of an object detection signal from the object detector is equal to or greater than the threshold. The adjustment unit is configured to decrease the threshold if the distance obtained from the measurement unit decreases. In this embodiment, if the vehicle is comparatively near an object (obstacle), the time lag for detecting the object can be reduced. If the vehicle is comparatively far from an object, it is possible to stably detect the object while reducing false detection.

In an embodiment, the object detector is configured: to periodically transmit transmission waves by a transmission signal in a particular direction of a vehicle equipped with the in-vehicle monitoring system; and to generate an object detection signal whenever receiving incoming waves.

In an embodiment, the adjustment unit is configured to decrease the threshold if the distance obtained from a transmission signal and an object detection signal decreases to a shorter distance than at least one reference value.

In an embodiment, the adjustment unit is configured to adjust the threshold by: decreasing the threshold if the present distance from the measurement unit is shorter than the previous distance from the measurement unit; and increasing the threshold if the present distance from the measurement unit is longer than the previous distance from the measurement unit. In this embodiment, if the vehicle relatively moves with respect to an object (obstacle) and approaches the object, the time lag for detecting the object can be reduced, thereby quickly notifying the driver of the presence of the object.

An in-vehicle monitoring system of the present invention comprises an object detector, a measurement unit, a judgment unit and an adjustment. The object detector is configured: to transmit transmission waves by a transmission signal; and then to generate an object detection signal if receiving incoming waves. The measurement unit is configured to measure the distance to the object based on a time interval from transmitting the transmission waves by the transmission signal to generating the object detection signal. The judgment unit is configured to determine the presence of an object when the number of continuous generations of an object detection signal from the object detector is equal to or greater than the threshold. The adjustment unit is configured to adjust the threshold based on the distance obtained from the measurement unit. The adjustment unit is configured: to adjust the threshold based on the present distance from the measurement unit if the previous distance from the measurement unit is shorter than a reference value and the present distance is longer than the reference value; and to adjust the threshold based on the previous distance from the measurement unit if the previous distance is longer than the reference value and the present distance from the measurement unit is shorter than the reference value. In this invention, it is possible to prevent the threshold from being decreased by sporadic noise. Accordingly, the false detection caused by sporadic noise can be reduced.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

First Embodiment

Figure 1:
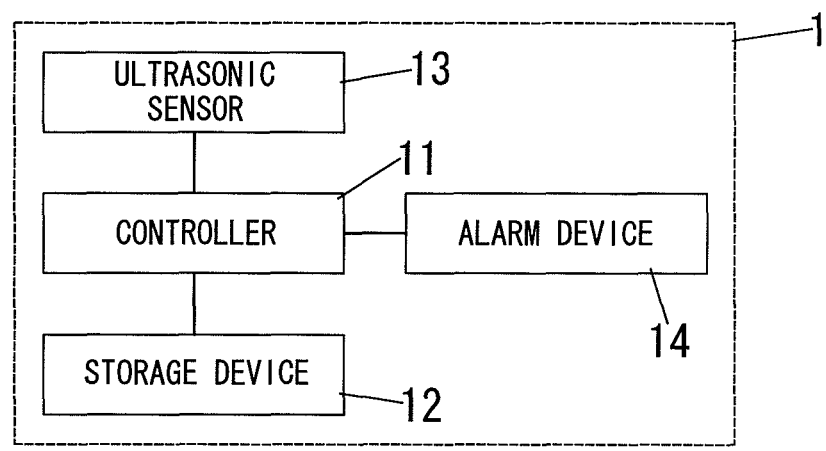
FIG. 1 is a block diagram of an in-vehicle monitoring system in accordance with an embodiment of the present invention.

FIG. 1 shows an in-vehicle monitoring system 1 in accordance with a first embodiment of the present invention. The system 1 is provided for a vehicle such as a car or the like, and is configured to detect an object (an obstacle) in a particular direction of a vehicle (e.g., in an anterior direction or in a posterior direction) equipped with the system 1 to give alarm or the like to a driver of the vehicle. Specifically, the system 1 is configured to determine the presence of an object when the number of continuous generations of an object detection signal obtained in connection with a transmission signal reaches a threshold.

As shown in FIG. 1, the in-vehicle monitoring system 1 includes a controller 11, a storage init 12, an ultrasonic sensor 13 (an object detector) and an alarm unit 14. The controller 11 includes a nonvolatile memory storing a program and parameters (e.g., at least one threshold, etc.), a microcomputer for running the program by using the parameter, and so on. This controller 11 is configured to control the overall operation of the in-vehicle monitoring system 1 by the program and the parameters. The storage init 12 is formed of, for example, a volatile memory (e.g., SRAM—static random access memory).

The ultrasonic sensor 13 is configured to transmit an ultrasonic sound (transmission waves) by a transmission signal, and then to generate an object detection signal if receiving incoming waves. Specifically, the sensor 13 is configured to periodically transmit transmission waves by a transmission signal in the particular direction, and to generate an object detection signal whenever receiving incoming waves. In the embodiment, the ultrasonic sensor 13 includes an ultrasonic transducer transmitter (not shown) and an ultrasonic transducer receiver (not shown). By way of another example, the sensor 13 may include an ultrasonic transceiver (transducer). The sensor 13 in the embodiment is controlled by the controller 11, and supplies the transmitter with a transmission signal in accordance with a control signal from the controller 11 to transmit an ultrasonic sound (transmission waves) in the particular direction from the transmitter. When the transmitted ultrasonic sound is reflected by an object in the particular direction, if the sensor 13 can receive an incoming signal corresponding to the reflected ultrasonic sound through the receiver, the sensor 13 generates an object detection signal to supply the object detection signal to the controller 11.

The alarm unit 14 includes, for example, a speaker and so on, and is configured to give notice of an approaching object (obstacle) to a driver of the vehicle by sound or the like. That is, the alarm unit 14 is configured, in accordance with a control signal from the controller 11, to give notice of caution or information to a driver of the vehicle by producing a warning sound, a predetermined voice or the like. By way of another example, the alarm unit 14 may include a liquid crystal display and give the driver notice of caution or information by character information or video through the display. In this instance, the notice may be superimposed on ambient video captured by a camera or the like, thereby providing detailed information.

The storage init 12 stores information such as the distance to an object detected through the ultrasonic sensor 13, the number of continuous generations of an object detection signal from ultrasonic sensor 13 (count value), or the like. The controller 11 reads and writes the information as the need arises.

The controller 11 is configured to detect the presence of an object in the particular direction by transmitting and receiving an ultrasonic sound through the ultrasonic sensor 13, and also to evaluate the distance to the object, namely the distance between the vehicle (ultrasonic sensor 13) and the object. Specifically, the controller 11 transmits an ultrasonic sound in the particular direction through the ultrasonic sensor 13 at predetermined intervals (transmission intervals). The controller 11 then tries to receive incoming waves (reflected waves) through the ultrasonic sensor 13 until the elapse of a predetermined time (a gate time for receiving incoming waves) corresponding to a predetermined detection range (e.g., 150 cm). If the controller 11 receives incoming waves within the gate time, the controller 11 functions as a measurement unit. That is, the controller 11 is configured to configured to calculate the distance to an object based on a time interval from transmitting transmission waves by a transmission signal to generating an object detection signal. The controller 11 also stores the distance in the storage init 12. Each of the transmission intervals is set to a time sufficiently longer than the gate time.

The controller 11 further functions as an adjustment unit and is configured to decrease a threshold if the distance obtained from a transmission signal and an incoming signal decreases. The controller 11 is also configured to increase the threshold if the distance obtained from a transmission signal and an incoming signal increases. In the embodiment, the controller 11 decreases the threshold if the distance obtained from a transmission signal and an object detection signal decreases to a shorter distance than at least one reference value. The controller 11 also increases the threshold if the distance obtained from a transmission signal and an object detection signal increases to a longer distance than the reference value. In the embodiment, a reference value is a reference distance. Specifically, if the controller 11 calculates the distance to an object in response to an input of reflected waves from the ultrasonic sensor 13 (i.e., an object detection signal), the controller 11 adjusts the threshold which is set to itself, in response to the calculated distance. The threshold represents the number of times for determining the presence of an object in the particular direction and is compared with the aforementioned count value.

TABLE 1

| Distance [cm] | Less than or equal to 25.0 | More than X and less than or equal to Y | | |
|---|---|---|---|---|
| | | X: 25.0 Y: 37.5 | X: 37.5 Y: 50.0 | X: 50.0 Y: 150.0 |
| Distance level | 1 (Near) | 2 (Medium) | 3 (Far) | 4 (Farthest) |
| Threshold | 2 | 3 | 4 | 5 |

In the embodiment, in order to adjust the threshold (variable threshold), first to third reference values are used (see table 1), and are 25.0 cm, 37.5 cm and 50.0 cm, respectively. Therefore, if the distance obtained from the measurement unit decreases to a shorter distance than the third reference value from a longer distance than 50.0 cm, or equals to the third reference value (i.e., the distance level 3), the controller 11 decreases the threshold from 5 to 4. If the distance obtained from the measurement unit decreases to a shorter distance of the distance level 2, the controller 11 decreases the threshold from 4 to 3. If the distance obtained from the measurement unit decreases to a shorter distance of the distance level 1, the controller 11 decreases the threshold from 3 to 2. To the contrary, if the distance obtained from the measurement unit increases to a longer distance of the distance level 2, the controller 11 increases the threshold from 2 to 3. If the distance obtained from the measurement unit increases to a longer distance of the distance level 3, the controller 11 increases the threshold from 3 to 4. If the distance obtained from the measurement unit increases to a longer distance of the distance level 4, the controller 11 increases the threshold from 4 to 5. At least one reference value of the present invention is not limited to the first to third reference values, and may be one reference value (e.g., the first reference value or the like), two reference values (e.g., the first and second reference values, the first and third reference values, the second and third reference value, or the like), or 4 or more reference values.

After adjusting the threshold, the controller 11 increases the count value stored in the storage init 12 to renew the count value. For example, one is added to the count value. The controller 11 also functions as a judgment unit and is configured to determine the presence of an object when the number of continuous generations of an object detection signal from the ultrasonic sensor 13 is equal to or greater than the threshold. In the embodiment, if the renewed count value is equal to or greater than the threshold, the controller 11 determines the presence of an object in the particular direction of the vehicle. The controller 11 then supplies a control signal to the alarm unit 14 to give alarm to a driver of the vehicle. Incidentally, if the controller 11 does not receive reflected waves (an object detection signal) from the ultrasonic sensor 13 within the gate time after transmitting transmission waves, the controller 11 judges that no object (obstacle) exists in the particular direction of the vehicle. The controller 11 then changes the count value stored in the storage init 12 to zero (default value). Therefore, the count value represents the number of continuous generations of an object detection signal from the ultrasonic sensor 13.

In the embodiment, if the number of continuous generations of receiving reflected waves by the ultrasonic sensor 13, namely an object detection signal is equal to or greater than the threshold, the presence of an obstacle is determined. Accordingly, the false detection that sporadic noise or the like is detected as an obstacle can be prevented.

After a distance is calculated based on a time interval from transmitting transmission waves to receiving reflected waves by the ultrasonic sensor 13, if the distance decreases to a shorter distance than any one of a plurality of reference values, the threshold is decreased to a corresponding value. Accordingly, it is possible to reduce a time lag from detecting reflected waves by an obstacle to giving alarm. If the distance between the vehicle and an obstacle increases to a longer distance than any one of the reference values, the threshold is increased to a corresponding value. Accordingly, the possibility of false detection caused by noise or the like can be reduced.

Second Embodiment

A second embodiment of the present invention is explained. For the purpose of clarity, like kind elements are assigned the same reference numerals as depicted in the first embodiment.

In the second embodiment, the controller 11 as an adjustment unit is configured to measure distance change based on distance information stored in the storage init 12 to adjust the threshold in accordance with the measured distance change. If the number of continuous outputs of a distance from the ultrasonic sensor 13 (i.e., the number of continuous generations of an object detection signal from the ultrasonic sensor 13) is equal to or greater than the threshold, the controller 11 supplies a control signal to the alarm unit 14.

If receiving reflected waves from the ultrasonic sensor 13 (i.e., an object detection signal), the controller 11 calculates the present distance based on the input of reflected waves. Specifically, the controller 11 calculates the present distance based on a time interval from transmitting transmission waves by a transmission signal to receiving the object detection signal. The controller 11 then stores the present distance in the storage init 12, and also reads the previous distance from the storage init 12. The controller 11 then compares the previous distance and the present distance.

If the present distance is shorter by a constant breadth or more (e.g., 3 cm or more) than the previous distance, the controller 11 detects that the vehicle equipped with the in-vehicle monitoring system 1 is approaching an object (approaching). In other words, when the present distance is shorter than the previous distance, the difference obtained by subtracting the constant breadth from the previous distance is used as a first reference value (reference distance). In this instance, if the present distance is equal to or shorter than the first reference value, the controller 11 detects that the vehicle is approaching an object.

If the present distance is longer by the constant breadth or more than the previous distance, the controller 11 detects that the vehicle is leaving an object (leaving). In other words, when the present distance is longer than the previous distance, the sum of the previous distance and the constant breadth is used as a second reference value (reference distance). In this instance, if the present distance is equal to or longer than the second reference value, the controller 11 detects that the vehicle is leaving an object.

The controller 11 otherwise detects that the vehicle is stopping (stopping). In other words, if the present distance is longer than the first reference value and shorter than the second reference value, the controller 11 considers that the vehicle is stopping. By way of another example, the constant breadth may be changed in response to, e.g., a measured distance, or the reference values of the first embodiment or the like may be used as long as at least "approaching", "stopping" and "leaving" can be each distinguished.

The controller 11 then adjusts the threshold in response to any of "approaching", "stopping" and "leaving" (see Table 2).

In an example of Table 2, the threshold is adjusted to 2, 3 or 4 in response to "approaching", "stopping" or "leaving", respectively.

TABLE 2

| | Status | | |
|---|---|---|---|
| | Approaching | Stopping | Leaving |
| Threshold | 2 | 3 | 4 |

Thus, the controller 11 adjusts the threshold in response to a status of "approaching", "stopping" or "leaving". The controller 11 then increases the count value stored in the storage init 12 to renew the count value. For example, one is added to the count value. If the renewed count value is equal to or more than the adjusted threshold, the controller 11 determines the presence of an abject (obstacle) in the particular direction of the vehicle and then supplies a control signal to the alarm unit 14 to give alarm to a driver of the vehicle.

In the embodiment, when the vehicle is approaching an obstacle, the variable threshold is the minimum value, and accordingly it is possible to reduce a time lag from detecting an obstacle through the ultrasonic sensor 13 to giving an alarm, thereby promptly giving an alarm to a driver of the vehicle. When the vehicle is leaving an obstacle, the variable threshold is the maximum value, and accordingly the possibility of false detection can be reduced. By way of another example, the threshold may be adjusted in combination with the measured distance. In this instance, when the vehicle is approaching an object from a close range, a time lag to giving an alarm can be further reduced and also false detection can be avoided.

Third Embodiment

A third embodiment of the present invention is explained. For the purpose of clarity, like kind elements are assigned the same reference numerals as depicted in the first embodiment. In the embodiment, the in-vehicle monitoring system 1 includes a storage init 12, an ultrasonic sensor 13 (an object detector) and an alarm unit 14 in the same way as the first embodiment. The system 1 also includes a controller 11 as a measurement unit and a judgment unit like the first embodiment. In an aspect of the embodiment, the system 1 functions as an adjustment unit and is configured to adjust the threshold based on the present distance from the measurement unit if the previous distance from the measurement unit is shorter than a reference value and the present distance is longer than the reference value; and to adjust the threshold based on the previous distance from the measurement unit if the previous distance is longer than the reference value and the present distance from the measurement unit is shorter than the reference value.

In the embodiment, a predetermined reference distance is used and set to, for example, 25.0 cm that is a border value between the distance level 1 (Near) and the distance level 2 (Medium) in Table 1. The controller 11 adjusts the threshold based on a relationship between the present distance and the previous distance from the ultrasonic sensor 13.

If receiving reflected waves from the ultrasonic sensor 13 (i.e., an object detection signal), the controller 11 calculates the present distance based on the input of reflected waves. Specifically, the controller 11 calculates the present distance based on a time interval from transmitting transmission waves by a transmission signal to receiving the object detection signal. The controller 11 then stores the present distance in the storage init 12, and also reads the previous distance from the storage init 12.

If the previous distance is shorter than the reference distance and the present distance is longer than the reference distance, the controller 11 adjusts the threshold in accordance with, for example, Table 1 based on the present distance. This example represents the change from detecting an object by distance level 1 (Near) to detecting the object by any of distance levels 2-4 (Medium, Far and Farthest). In other words, the first reference value (25.0 cm) in Table 1 is used as a primary reference value. If the previous distance is shorter than the primary reference value and the present distance is longer than the primary reference value, the controller 11 (adjustment unit) adjusts the threshold in accordance with any of the first to third reference values corresponding to the present distance. Specifically, the threshold is adjusted from the threshold of the distance level 1 to any threshold of the distance levels 2-4 corresponding to the present distance. If the previous distance is shorter than the primary reference value and the present distance is also shorter than the primary reference value, the controller 11 may adjust the threshold to the threshold of the distance level 1 corresponding to the present distance.

If the previous distance is longer than the reference distance and the present distance is shorter than the reference distance, the controller 11 adjusts the threshold in accordance with, for example, Table 1 based on the previous distance. This example represents the change from detecting an object by any of distance levels 2-4 (Medium, Far and Farthest) to detecting the object by distance level 1 (Near). In other words, if the previous distance is longer than the primary reference value and the present distance is shorter than the primary reference value, the controller 11 (adjustment unit) adjusts the threshold in accordance with any of the first to third reference values corresponding to the previous distance. If the previous distance is longer than the primary reference value and the present distance is also longer than the primary reference value, the controller 11 may adjust the threshold in accordance with any of the first to third reference values corresponding to the previous distance.

Figure 2:
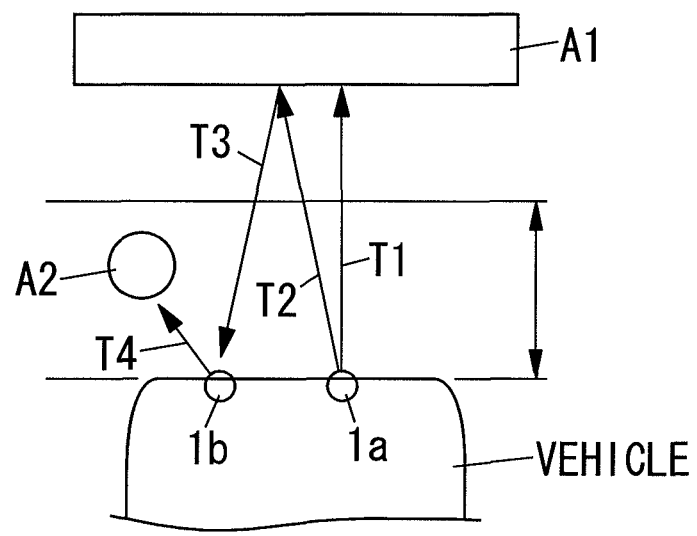
FIG. 2 is an explanatory diagram of an in-vehicle monitoring system in accordance with an embodiment of the present invention.

As shown in FIG. 2, the embodiment includes in-vehicle monitoring systems 1a and 1b which are located on both sides of the front of a vehicle (e.g., a front bumper) and used to detect an object (obstacle) in a particular direction (an anterior direction) of the vehicle, respectively. An obstacle (A1) and an obstacle (A2) exist in the particular direction, and the obstacle (A1) is out of the detection range of the ultrasonic sensor 13, while the obstacle (A2) is in the detection range.

Figure 3:
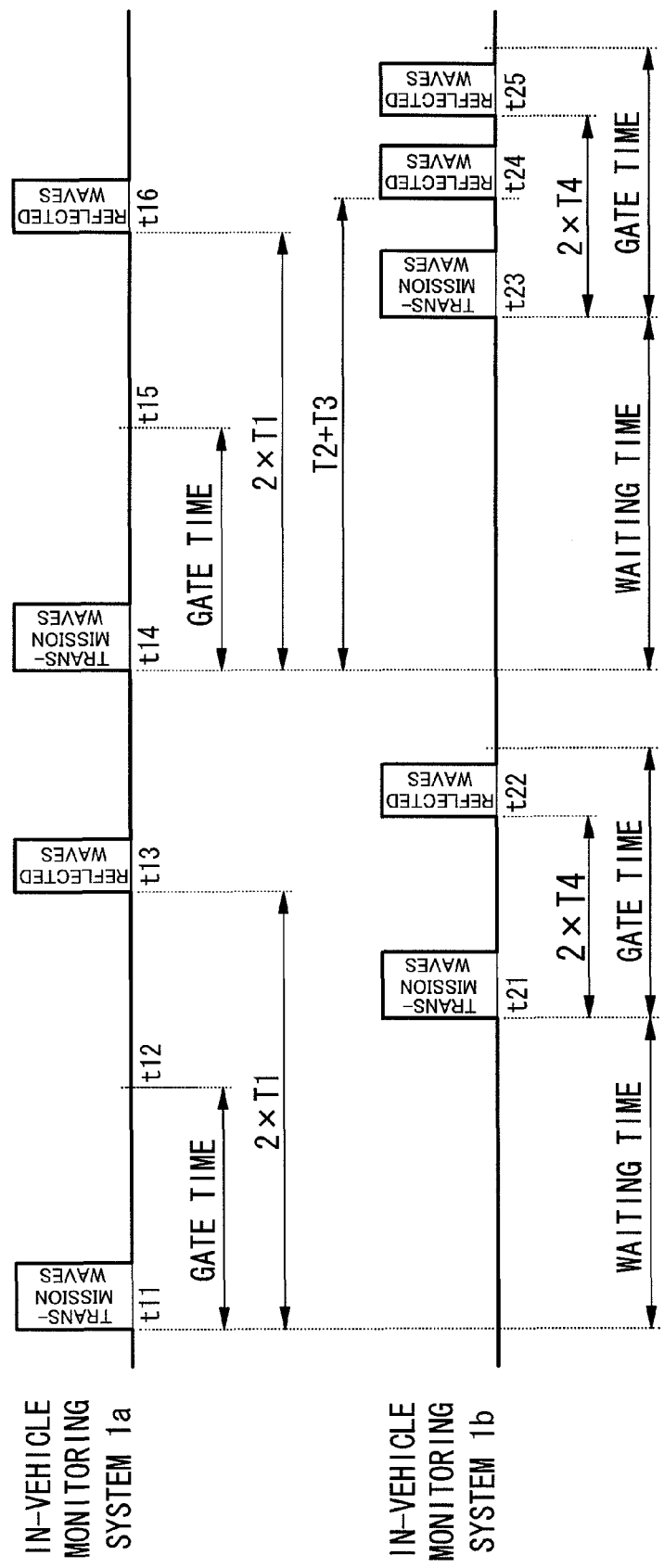
FIG. 3 is an explanatory diagram of an in-vehicle monitoring system in accordance with an embodiment of the present invention.

As shown in FIG. 3, the in-vehicle monitoring systems 1a and 1b are configured to transmit transmission waves through their own ultrasonic sensors 13 at different transmission timing, respectively. In the example of FIG. 3, t11, t12, . . . are the timing of transmission waves from the in-vehicle monitoring system 1a, and t21, t22, . . . are the timing of transmission waves from the in-vehicle monitoring system 1b. That is, the in-vehicle monitoring system 1b transmits transmission waves after the elapse of a predetermined waiting time from the in-vehicle monitoring system 1a transmitting transmission waves. Each gate time of the in-vehicle monitoring systems 1a and 1b is shorter than each transmission cycle of the systems 1a and 1b. Each of the in-vehicle monitoring systems 1a and 1b is configured to detect the non-presence of an object (an obstacle) if not receiving incoming waves (reflected waves) within its own gate time.

The operation from t11 to t22 in FIG. 3 is first explained. In the operation, any transmission waves interferes with the other transmission waves. That is, the in-vehicle monitoring system 1a transmits transmission waves through the ultrasonic sensor 13 (t11), and then receives reflected waves after the elapse of a time corresponding to the distance to the object A1 (t13). In this instance, the system 1a receives the reflected waves after the elapse of the gate time (t11-t12) of the ultrasonic sensor 13, and accordingly the controller 11 detects the non-presence of an object (an obstacle).

The in-vehicle monitoring system 1b transmits transmission waves through the ultrasonic sensor 13 of the system 1b after the elapse of the waiting time (t11-t21) from the in-vehicle monitoring system 1a transmitting the transmission waves through the ultrasonic sensor 13 of the systems 1a. In this instance, the transmission waves are reflected by the object A2, and the in-vehicle monitoring system 1b receives the reflected waves after the elapse of a time corresponding to the distance to the object A2 (t22). The distance to the object A2 is near and the propagation time is in the gate time of ultrasonic sensor 13 in the system 1b, and accordingly the controller 11 of the system 1b detects the presence of an object.

By repeating the operation, an object (A2) inside each detection area of the ultrasonic sensors 13 is detected, while an object (A1) outside each detection area is not detected.

The operation from t14 to t25 in FIG. 3 is next explained. In the operation, interference occurs between the in-vehicle monitoring systems 1a and 1b. After the operation from t11 to t22, the in-vehicle monitoring system 1a transmits transmission waves through the ultrasonic sensor 13 (t14), and then receives reflected waves after the elapse of a time corresponding to the distance to the object A1 (t16). In this instance, the system 1a receives the reflected waves after the elapse of the gate time of the ultrasonic sensor 13 (t16), and accordingly the controller 11 detects the non-presence of an object (obstacle). On the other hand, the in-vehicle monitoring system 1b transmits transmission waves (t23), and receives reflected waves after the elapse of a time corresponding to the distance to the object A2 (t25). However, during t23-t25, the in-vehicle monitoring system 1b may receive the reflected waves by the transmission waves from the in-vehicle monitoring system 1a (t24). In this instance (interference occurrence), if the in-vehicle monitoring system 1b receives the reflected waves, the controller 11 of the system 1b calculates the distance to the object A2 based on the time from t23 to t24 (t24-t23). As a result, the controller 11 is to evaluate a shorter distance than the correct distance to the object A2.

In the embodiment, if the previous distance is longer than the reference distance (primary reference value) and the present distance is shorter than the reference distance, the threshold is adjusted by using the previous distance larger than the reference distance. Accordingly, even if a shorter distance than the correct one is sporadically measured by interference, it is possible to prevent the threshold from being reduced. Thereby, the threshold can be adjusted by using a correct distance and the possibility of false detection can be reduced.

Similarly, even if each ultrasonic sensor 13 supplies a corresponding controller 11 with an object detection signal in response to noise or the like, it is possible to prevent the threshold from being reduced excessively and to reduce the possibility of false detection.

Although the present invention has been described with reference to certain preferred embodiments, numerous modifications and variations can be made by those skilled in the art without departing from the true spirit and scope of this invention, namely claims.

The invention claimed is:

1. An in-vehicle monitoring system configured to determine presence of an object when a number of continuous generations of an object detection signal obtained in connection with a transmission signal reaches a threshold,
wherein the in-vehicle monitoring system comprises:
a controller configured to decrease the threshold if a distance obtained from the transmission signal and the object detection signal decreases,
an object detector configured to transmit transmission waves by the transmission signal and then to generate the object detection signal if the object detector receives incoming waves;
a measurement unit configured to measure the distance to the object based on a time interval from transmitting the transmission waves by the transmission signal to generating the object detection signal; and
a judgment unit configured to determine the presence of the object when the number of continuous generations of the object detection signal from the object detector is equal to or greater than the threshold,
wherein the controller is configured to decrease the threshold if the measured distance obtained from the measurement unit decreases, and
the controller is configured to adjust the threshold by decreasing the threshold if a present distance from the measurement unit is shorter than a previous distance from the measurement unit; and increasing the threshold if the present distance from the measurement unit is longer than the previous distance from the measurement unit.

2. The in-vehicle monitoring system of claim 1, wherein the object detector is configured to periodically transmit the transmission waves by the transmission signal in a particular direction of a vehicle equipped with the in-vehicle monitoring system and to generate the object detection signal whenever the object detector receives the incoming waves.

3. The in-vehicle monitoring system of claim 1, wherein the controller is configured to decrease the threshold if the distance obtained from the transmission signal and the object detection signal decreases to a shorter distance than at least one reference value.

4. An in-vehicle monitoring system, comprising:
an object detector configured to transmit transmission waves by a transmission signal and then to generate an object detection signal if the object detector receives incoming waves;
a measurement unit configured to measure a distance to the object based on a time interval from transmitting the transmission waves by the transmission signal to generating the object detection signal;
a judgment unit configured to determine presence of the object when a number of continuous generations of the object detection signal from the object detector is equal to or greater than a threshold; and
a controller configured to adjust the threshold based on distances obtained from the measurement unit,
wherein the controller is configured to adjust the threshold based on a present distance from the measurement unit if a previous distance from the measurement unit is shorter than a reference value and the present distance is longer than the reference value, and to adjust the threshold based on the previous distance from the measurement unit if the previous distance is longer than the reference value and the present distance from the measurement unit is shorter than the reference value.

* * * * *